May 19, 1953 — R. T. HAIR — 2,639,101
REEL DRIVE AND CONTROL MECHANISM
Filed Feb. 26, 1947
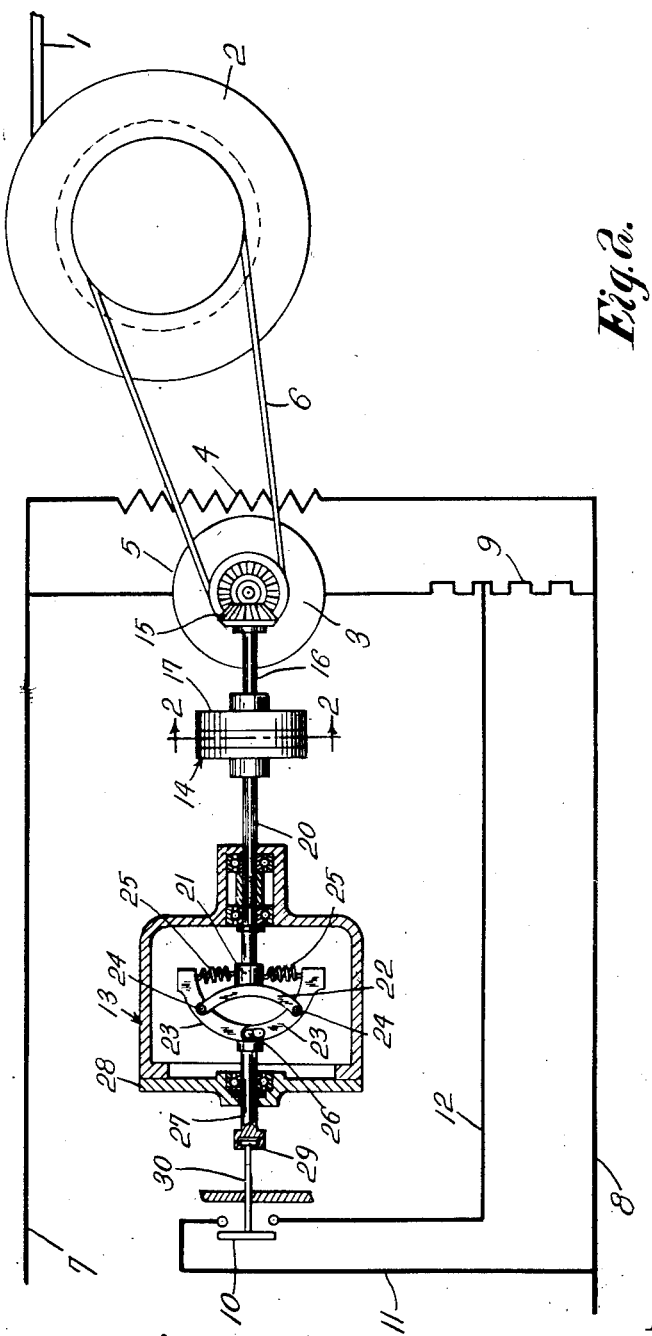
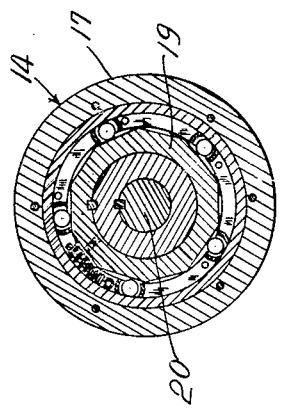
Inventor:
Richard T. Hair.
by Louis A. Maxson,
Atty.

Patented May 19, 1953

2,639,101

UNITED STATES PATENT OFFICE 2,639,101

REEL DRIVE AND CONTROL MECHANISM

Richard T. Hair, Franklin, Pa., assignor to Joy Manufacturing Company, a corporation of Pennsylvania Application February 26, 1947, Serial No. 731,120

14 Claims. (Cl. 242—90)

My invention relates to cable reel drive and control mechanisms, and particularly to such drive and control mechanisms for use on mine vehicles such as locomotives, "shuttle cars," etc.

In mining operations it is frequently necessary for a vehicle which is operated by current supplied to it by a cable wound on a reel which moves with the vehicle, to be operated now in a direction toward the point of attachment of the cable and again in a direction to require paying out of the cable. It is important that when the vehicle moves toward the point of cable attachment the cable be wound up in order that it may not be run over and injured, and it is desirable that when the vehicle moves away from the point of attachment of the cable there be reduction in the tension imposed on the cable. When the cable reel is driven by an electric motor it is desirable that the voltage imposed on the motor be reduced when cable is to be drawn off of the reel, in order to reduce the heating of the motor and also in order that the cable be not maintained under unnecessarily high tension. A desirable arrangement for accomplishing the objectives mentioned is to provide an electric driving motor for the reel and to provide means for decreasing current supply to the motor—for including resistance in series with the motor armature—when the reel is rotated in the direction in which it turns during pulling off of cable. Desirably, the inclusion of the resistance should be automatically effected, and not require any act on the part of the operator to accomplish this result other than what might be called a normal control of the vehicle itself. In order that the operation may be entirely automatic, the means which control it should be so connected with the reel driving mechanism that it will be automatically caused to operate whenever the reel drive is such as to render its operation desirable. In order that the cable may be immediately wound up when the vehicle starts towards the point of attachment of the cable, the torque on the reel may be automatically increased whenever the reel commences to rotate in a direction to wind in the cable. Moreover, since the drive is to be such that, irrespective of the direction of rotation of the reel, at least the initial portion of the drive will be set in motion, a uni-directional driving arrangement must be provided so that only when the cable is to be wound upon the reel will the torque be increased. When the reel is stationary, the torque will automatically be the low torque with an arrangement of the character described.

Objects of my invention are to provide an improved reel drive and control mechanism adapted to meet the problems which have been described, to effect a reduction in the forces having to be overcome when cable is drawn off of the reel as compared with the forces exerted to effect winding-in operation of the reel, to do this automatically when the direction of reel rotation is changed from a winding-in to a paying-out one or when the reel ceases to rotate; to provide an improved controlling apparatus for a reel driving motor for including resistance in the motor circuit when the motor must be driven backward in order that cable may be drawn off the reel; to provide an improved control for a motor circuit including a resistance controlling switch and a speed responsive control thereof so associated with the switch as to provide the desired opening and closing movements of the latter; and to provide an improved reel driving and controlling system in which, while the drive is from an element always turning with the reel, there will be a reduction in the electro-motive force imposed on the reel whenever the reel is operated in an unwinding direction, or brought to a stop; and the imposed electro-motive force will be increased automatically when the reel is rotated in a direction to wind in the cable. The power imposed on the reel driving motor, even when the resistance is in series with the reel driving motor, must be sufficient to enable this motor to drive the reel when the cable can be wound in. These and other objects of the invention will hereinafter more fully appear.

In the accompanying drawings, in which one illustrative embodiment which my invention may assume in practice has been shown for purposes of illustration—

Fig. 1 is a diagrammatic view of a cable reel, driving means therefor, and improved control means for said driving means, and Fig. 2 is a transverse section, on the plane of the line 2—2, through a uni-directional drive clutch shown in Fig. 1.

Referring to the drawings, 1 represents an electric cable of which the free end is adapted to be attached to a suitable junction box or to a track and trolley wire, or to any other suitable source of current. The cable is adapted to be wound upon and to be drawn off of a cable reel 2. Reel 2 has a driving motor 3, which may be a torque motor, and which has, as illustrated, a shunt field winding 4 and an armature 5. A suitable flexible drive 6 is provided between the motor 3 and the reel 2. Current is supplied to the motor from conductors 7 and 8, which are connected in any suitable manner with the cable 1, as through collector rings (not shown) rotating with the reel, and appropriate control devices. As these connections between the rotating reel and the conductors 7 and 8 and the control switch are conventional, they are not illustrated. A resistance 9 adapted substantially to reduce the torque exerted by the motor 3 when the full armature current passes through it may be short-circuited by means of the switch 10 and the conductors 11 and 12, closure of the switch providing a low resistance path around at least the major portion of the resistance 9. A part of it may remain in the circuit to predetermine the maximum torque to be exerted.

In order that the switch 10 may be entirely automatically controlled, and may be closed whenever a period of winding up of the cable 1 starts, but may be caused to open to reduce the torque of the motor 3 promptly upon the initiation of a drawing off of the cable 1 from the reel 2, or even upon stopping of the reel, this switch is placed under the control of two devices, a speed responsive mechanism 13 and an overrunning or uni-directional drive clutch mechanism 14. In order that the speed responsive device 13 may be caused to operate promptly upon the starting of rotation of the reel 2 in the direction to wind in the cable, the drive for the devices 13 and 14 is so associated with the reel that rotation of the reel will cause virtually immediate switch movement when the reel turns in the direction necessary to effect switch closure; and as illustrative of one means of accomplishing this result, a geared connection 15 is provided between the motor 3 and the switch controlling mechanism, it being understood that this geared connection is but illustrative and that any desired degree of multiplication of the speed of the element driven with the reel will be provided through proper selection of the cooperating parts of the drive. In other words, instead of the shown one-to-one ratio between the motor 3 and the controlling elements driven by the motor, this ratio may be made just as high as desired.

The drive 15 is adapted to rotate a shaft 16, which actuates a casing 17 of the overrunning clutch mechanism 14, whose inner element 19 is connected to an operating shaft 20 of the speed responsive mechanism 13. It will be observed, on reference to Fig. 2, in which a conventional overrunning type of clutch is shown, that on clockwise rotation of the casing 17 as viewed in Fig. 2, no drive will be transmitted to the shaft 20, but that on counter-clockwise rotation of the casing the shaft 20 will be driven at the same rate as the shaft 16.

The speed responsive mechanism 13 is simply diagrammatically illustrated, and will be so selected as to render it highly responsive to speed changes and to cause it to respond very quickly to rotation of the shaft 20. It will be observed that, as shown, a collar 21 carries a yoke 22 on which weight-carrying arms 23 are pivoted at 24; that suitably proportioned springs 25 normally maintain the free ends of the arms 23 in their relatively nearest positions to each other when the shaft 20 is not rotated; that the adjacent ends of the arms 23 are suitably connected, as at 26, to a rotatable shaft 27 journaled in a casing 28, in which the speed responsive elements are housed; that an anti-friction connection 29 is provided between the shaft 27 and a polygonal non-rotating switch operating shaft 30; and that the shaft 30 is operatively connected to the movable switch element 10. The specific speed responsive switch mechanism described is of course but illustrative.

It will be noted that when the cable 1 is to be wound in, in Fig. 1, the reel 2 will be rotated counter-clockwise by the then counter-clockwise rotating motor 3; that the casing 17 of the overrunning clutch mechanism 14 will then turn in a counter-clockwise direction in Fig. 2, and accordingly that the shaft 20 will be rotated with the shaft 16; and accordingly the free ends of the weighted arms 23 will swing apart from the position shown in Fig. 1, and the switch 10 be closed. As a result, the resistance 9 will be short-circuited and the full torque of the motor 3 will be exerted on the reel, and the cable 1 will be wound in. It will be understood, of course, that at this time the controls for the propulsion mechanism of the vehicle are causing the vehicle to be propelled in the direction to wind cable on the reel. If it be desired to propel the vehicle in a direction which will require the unwinding of cable, it will be undesirable, as previously explained, to place any greater tension on the cable than necessary, and so the resistance 9 may desirably be effectively in series with the armature of the motor. The reel 2 may now be considered as the driving means, because it will be required to rotate as the cable is drawn off of it, and the reel will drive the motor as a generator and the direction in which the motor will be caused to turn will be such as to result in the transmission of no rotation through the uni-directional clutch mechanism 14, and accordingly the switch 10 will stand open and the resistance 9 will be in series with the armature of the motor 3. Indeed, when the motor 3 ceases to rotate, in its transition from turning in the winding direction to turning in the opposite direction, there is an interruption of rotation of the speed responsive device, and that in itself causes the opening of the switch 10 to take place under the action of the springs 25, so that even before the direction of the motor is reversed as the reel turns backwards under the tension of the cable as the vehicle moves away from the point of attachment of the cable, the resistance is cut into the motor circuit and the torque reduced. Also, when the vehicle is stationary, there will be no rotation of the reel, at least ordinarily, so the motor 3 will not be heated as much as would occur were the resistance 9 not in circuit with it.

From the foregoing description it will be apparent that I have provided a very desirable control for the reel of a vehicle whose propulsion is effected by power supplied by means of a cable wound on a reel moving with the vehicle; that the cable is adequately protected against injury by being run over, because the reel driving motor exerts an entirely adequate torque to wind in the cable just as rapidly as is possible when the vehicle is moving toward the point of attachment of the cable or in any direction to shorten the free length of the cable. Moreover, whenever the vehicle comes to a standstill or whenever it moves in a direction to necessitate lengthening of the cable portion which extends from the reel to a point of attachment, the resistance will be included in series with the motor armature, thereby reducing the torque. However, while the torque is reduced, it is not completely eliminated, and the power of the motor will be sufficient to cause the reel to be driven in a "winding-in" direction and to bring into operation the centrifugal mechanism for cutting out the resistance, whenever the vehicle moves in a direction to introduce some slack into the cable.

It will further be noted that I have provided an improved drive and control arrangement for a vehicle mounted winding drum or reel adapted to have a flexible power supply element wound upon it, including a device having driving connections with such drum of such a nature that each may drive the other, and operative on supply of energy thereto to exert a torque on and tend to drive the drum to maintain the flexible power supply element connected to the drum under tension and when driven in the opposite direction by the drum, as the flexible power supply element is pulled off of the drum, to oppose to drum rotation a resistance sufficient to maintain said element under a tension, but under a tension less than said device causes to be exerted on said element during winding in of the same.

While I have in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A control system for a motor operating a vehicle mounted cable reel or drum for a cable supplying electrical energy to the vehicle from an external source, comprising means operable to vary the torque of the cable reel driving motor to increase it throughout the drive of said reel or drum by said motor and control means for said torque varying means including a speed responsive device connected with said torque varying means and effective whenever driven at or above a predetermined speed to cause said torque varying means to effect, and maintain so long as so driven, an increased torque and means for driving said speed responsive device during rotation of the reel in but one direction.

2. A control system for a motor operating a vehicle mounted cable reel or drum for a cable supplying electrical energy to the vehicle from an external source, comprising means operable to vary the torque of the cable reel driving motor and control means for said torque varying means including a speed responsive device operative whenever rotated at or above a predetermined rate to operate said torque varying means to effect and to maintain, so long as so driven, an increase in motor torque and means for driving said speed responsive device during rotation of the reel in a cable winding direction only.

3. A control system for a motor operating a vehicle mounted cable reel or drum for a cable supplying electrical energy to the vehicle from an external source, comprising means operable to vary the torque of the cable reel driving motor and control means for said torque varying means including a speed responsive device operative whenever, and so long as, rotated at or above a predetermined rate to operate said torque varying means to effect increase in motor torque and means including a unidirectional clutch for driving said speed responsive device during rotation of the reel in a cable winding direction only.

4. A vehicle mounted cable reel for a cable supplying electrical energy to a vehicle from an external source, a motor connected to said reel to drive the latter to wind in cable and to be turned in an opposite direction when cable is drawn off the reel, means for controlling the torque exerted by said motor including a speed responsive device effective whenever, and so long as, driven at or above a predetermined speed to cause the exertion of increased torque, and means including a driving element connected for rotation with said reel at all times when the latter is rotated for transmitting a drive to said speed responsive device only when the reel is turned in a direction to wind in the cable.

5. A control system for a motor for operating a cable reel on which a cable is wound through which cable electrical energy is supplied from an external source to the vehicle to effect propulsion thereof, circuit means for supplying current to the cable reel motor, switch means operable to alter the resistance of the circuit means, and means for effecting operation of the switch means to decrease such resistance whenever a change in the motion of the vehicle necessitates a change from paying out to winding in of the cable and to maintain such decreased resistance during continued winding in of the cable, said means including a speed responsive device driven from the cable reel.

6. In combination, a vehicle mounted winding drum adapted to have a power cable wound thereon and to wind in the cable or to have the cable drawn off of the same, depending upon the direction of vehicle movement, a device having driving connections with the drum such that each may drive the other and operative on the supply of energy thereto to exert a torque on said drum in a winding-in direction, and means controlled by the direction of rotation of said drum and including a speed responsive device idle during one direction of drum rotation and a unidirectional drive for the latter for causing cable tension during cable unwinding to be less than cable tension during cable winding at a constant rate.

7. In combination, a vehicle mounted winding drum adapted to have a power cable wound thereon and to wind in the cable or to have the cable drawn off of the same, depending upon the direction of vehicle movement, a device having driving connections with the drum such that each may drive the other and operative on the supply of energy thereto to exert a torque on said drum, and means, including a speed responsive device connected for rotation with said winding drum while the latter is rotating in a cable-winding direction but not in cable-unwinding direction, for causing tension to be less during cable unwinding, notwithstanding there is at that time supply of energy to said first mentioned device, than during winding up of cable at constant speed.

8. In combination, a vehicle mounted winding drum adapted to have a power cable wound thereon and to wind in the cable or to have the cable drawn off of the same depending upon the direction of vehicle movement, a device having driving connections with the drum such that each may drive the other and operative on the supply of energy thereto to exert a torque on said drum, and means for controlling the torque exerted by said device including a member shiftable from one position to another to alter the torque exerted by said device and controlling means for said member for exerting a moving force thereon to cause, when said drum drives said device during drawing off of cable from said drum and also when said drum is not turning, said device to exert a lesser torque than during constant rate cable winding, said controlling means including an actuating device rendered inoperative at such times but actuated throughout cable winding at and above a predetermined rate.

9. In a control system for a motor for effecting operation of a reel for a cable by means of which electrical energy is supplied to the propulsion motor of a vehicle, automatic control means operable to increase the torque of the reel motor when the vehicle moves towards the point of attachment of the cable, including an element having a normal position in which the torque of the reel motor is reduced and movable to another position to effect an increase in the torque to a value appropriate to the winding in of the cable during vehicle movement towards the point of cable attachment to a source of electrical energy, and means for controlling the position of said element including a device operatively connected to said element to move the same to said other position when driven at a predetermined speed and to maintain it in such position throughout such drive, and unidirectional means for driving said element at a rate proportional to the rate of reel rotation.

10. In a control system for a motor for effecting operation of a reel for a cable by means of which electrical energy is supplied to the propulsion motor of a vehicle, control means operable to increase the torque of the reel motor when the vehicle moves towards the point of attachment of the cable, including an element having a normal position in which the torque of the reel motor is reduced and movable to another position to effect an increase in the torque to a value appropriate to the winding in of the cable during vehicle movement towards the point of cable attachment to a source of electrical energy, and means for controlling the position of said element including a device operatively connected to said element to move the same to said other position when driven at a predetermined speed and to maintain it in such position during maintained drive at such predetermined speed, and means including a unidirectional clutch for driving said element at a rate proportional to the rate of reel rotation, but only during rotation of said reel in a direction to effect cable winding.

11. In a control system for a motor for effecting operation of a reel for a cable by means of which electrical energy is supplied to the propulsion motor of a vehicle, control means operable to increase the torque of the reel motor when the vehicle moves towards the point of attachment of the cable, including an element having a normal position in which the torque of the reel motor is reduced and movable to another position to effect an increase in the torque to a value appropriate to the winding in of the cable during vehicle movement towards the point of cable attachment to a source of electrical energy, and means for controlling the position of said element including a device operatively connected to said element to move the same to said other position when driven at a predetermined speed and to maintain it in said other position so long as said predetermined speed of drive continues, and means for driving said element at a rate proportional to the rate of reel rotation including a unidirectional driving means for effecting rotation thereof only during translative movement of the reel in a direction tending to introduce slack into the cable.

12. In a control system for a vehicle mounted winding drum adapted to have a flexible power supply element wound upon it, in combination, a drum, a device having driving connections with said drum whereby each may drive the other, said device operative on supply of energy thereto to exert a torque tending to drive the drum and maintaining the flexible power supply element on the drum under tension, means for connecting said device with a source of operating medium, and means, including devices driven by and governed by the rotation of said first mentioned device, one speed-responsive and the other a unidirectional motion transmitting device, for automatically reducing, when the drum ceases to rotate, the torque exerted by said first mentioned device while the latter remains connected with the source of operating medium, to a value below that which is exerted when said drum is turning at a constant speed.

13. In a control system for a vehicle mounted winding drum adapted to have a flexible power supply element wound upon it, in combination, a drum, a device having driving connections with said drum whereby each may drive the other, said device operative on supply of energy thereto to exert a torque tending to drive the drum and maintaining the flexible power supply element on the drum under tension, means for connecting said device with a source of operating medium both during drive of the drum by said device and drive of said device by the drum, and means for automatically reducing the torque exerted by said device, when the drum ceases to rotate and said device is still connected with said source of operating medium, to a value below that exerted at constant speed drum drive by said device, including a control element shiftable in position to control oprating medium and, for governing the position of said element, devices one driven by, and another governed by the rotation of, said first mentioned device.

14. In a cable reeling mechanism adapted to supply power to a moving vehicle, a winding drum adapted to have a cable wound thereon, a motor for driving said drum in a direction to wind cable thereon, connections between said motor and said drum transmitting rotation from said motor to said drum when said motor is supplying a torque sufficient to effect winding in of cable and transmitting rotation from said drum to said motor in an opposite direction against the torque of the latter when cable is being unwound from said drum, and means for altering the torque exerted by said motor to effect the exertion by it of a higher torque while it is driving the drum to effect cable winding and of a lower torque when said drum is effecting reverse rotation of said motor during cable unwinding including an element moved in opposite directions to effect respectively torque increase and torque decrease and control means for said element including a speed responsive device rotation of which at or above a predetermined speed causes said element to occupy its position for effecting torque increase, and a unidirectional drive including an element connected for rotation with said drum irrespective of the direction of rotation of the latter, for transmitting rotation to said speed responsive device only when said drum is rotating in a cable winding direction.

RICHARD T. HAIR.

References Cited in the file of this patent

UNITED STATES PATENTS

| Number | Name | Date |
|---|---|---|
| 685,852 | Kragh | Nov. 5, 1901 |
| 738,871 | Alexander | Sept. 15, 1903 |
| 928,013 | Wolcott | July 13, 1909 |
| 1,206,309 | Davis | Nov. 28, 1916 |
| 1,807,280 | Carpenter | May 26, 1931 |
| 2,090,707 | Sloane | Aug. 24, 1937 |
| 2,359,123 | Krapf | Sept. 26, 1944 |
| 2,395,302 | Slomer | Feb. 19, 1946 |